Dec. 20, 1938.  R. T. ECKLUND ET AL  2,140,831
ABRADING DEVICE
Filed May 15, 1937   2 Sheets-Sheet 1

Inventors:
Rudolph T. Ecklund.
Peter C. Neilsen.
By: Zehl, Carlson & Wells
Attorneys

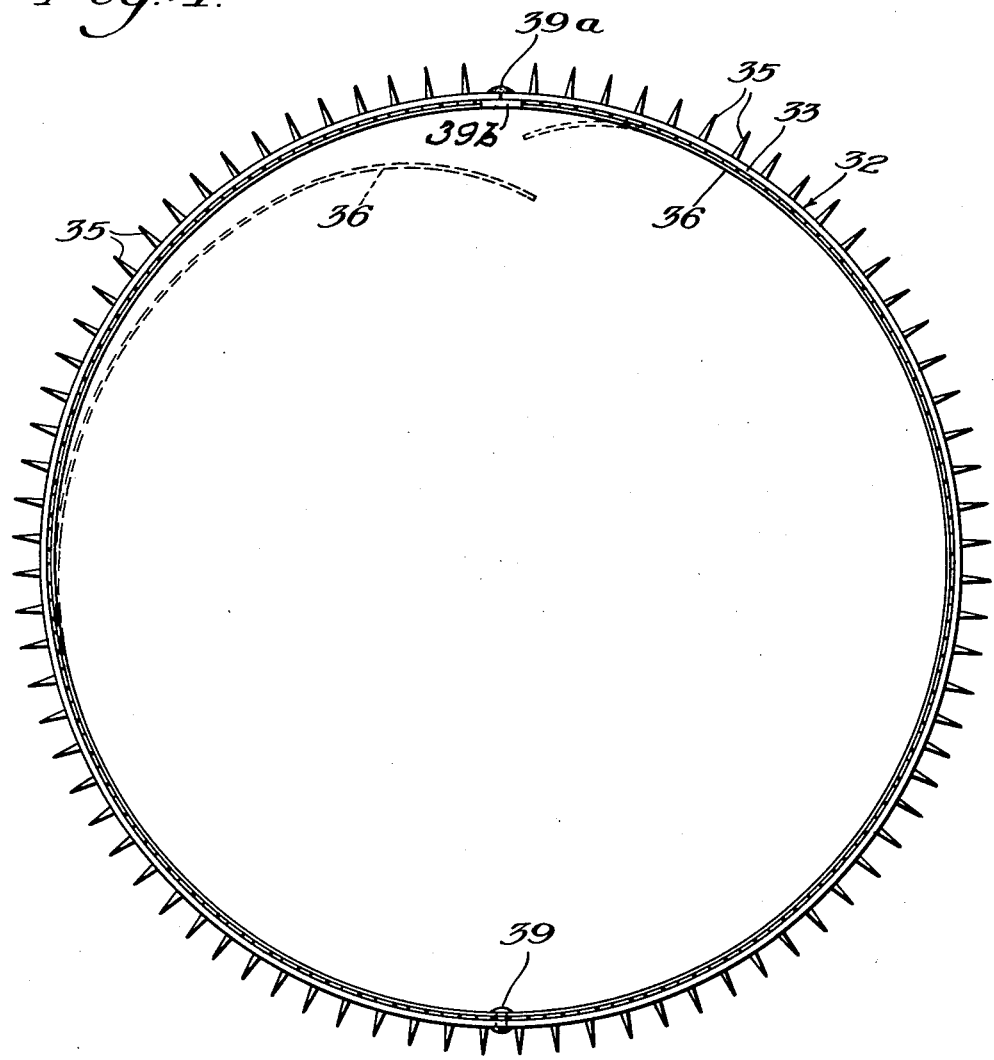

Patented Dec. 20, 1938

2,140,831

UNITED STATES PATENT OFFICE 2,140,831

ABRADING DEVICE

Rudolph T. Ecklund and Peter C. Neilsen, Chicago, Ill.

Application May 15, 1937, Serial No. 142,729

2 Claims. (Cl. 29—78)

The invention relates to abrading devices and is particularly adapted to be embodied in devices for removing varnish from old wooden surfaces, refinishing floors, leveling wooden surfaces, and scraping the treads from old tires so that the casings may be re-treaded.

One form of the invention is embodied in two frustro-conical drum sections adapted to be mounted on a shaft to rotate them, the frustro-conical surfaces of the drum surfaces being adapted to clamp a rubber annulus between them, which annulus carries a fabricated band having a plurality of sharp points projecting therefrom. The construction is such that the drum sections may be assembled and the parts carried thereby may be assembled quickly, the drum sections having a wedging action upon the rubber annulus which tends to stretch it so that it will frictionally engage the band with sufficient force to prevent the band from slipping on the annulus.

Other objects and advantages will become apparent as the following detailed description progresses, reference being had to the accompanying drawings, wherein—

Fig. 4 is a side elevation of a fabricated band which forms part of the improved abrading device.

Figure 1:
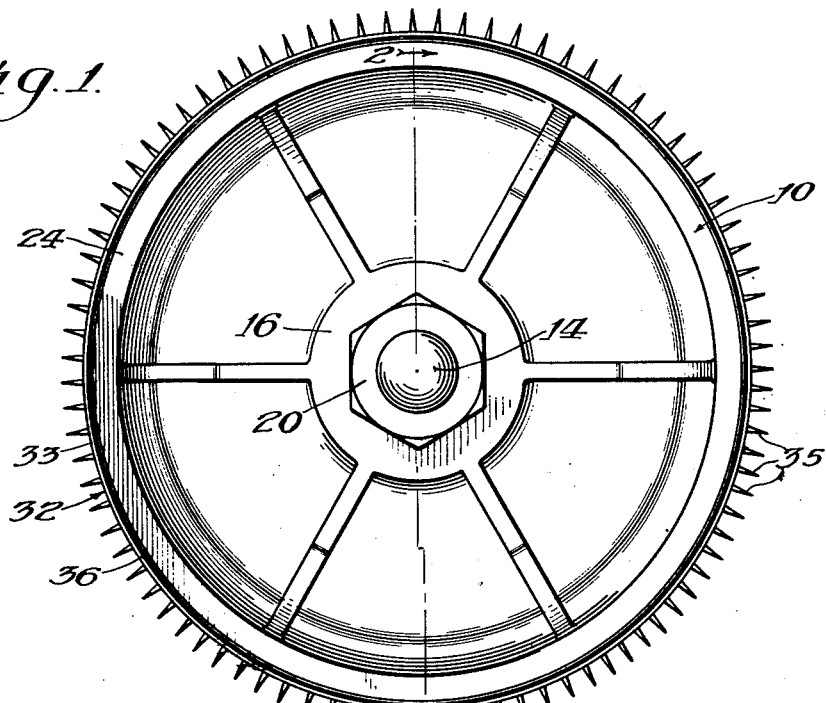
Fig. 1 is a side elevation of the abrading device which embodies the invention.
Figures 2, 3:
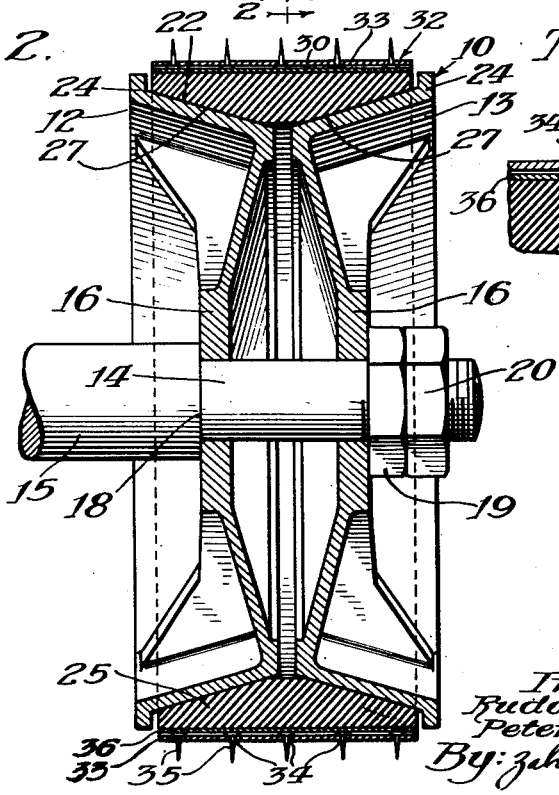
Fig. 2 is a section taken on line 2—2 of Fig. 1.
Fig. 3 is an enlarged fragmentary section taken on the same line as Fig. 2 but illustrating certain details of construction at a larger scale.

Referring to the drawings, wherein a preferred form of the invention is embodied, the reference character 10 designates generally a drum section which comprises a pair of drum sections 12 and 13 mounted upon the reduced end 14 of an arbor or shaft 15, the drum sections 12 and 13 being provided with hubs 16 through which the reduced portion 14 of the arbor or shaft extends. One hub section 16 abuts against a shoulder 18 formed upon the arbor or shaft 15. A nut 19 screw-threaded upon the reduced portion 14 abuts against the other hub 16 and is backed by a lock nut 20. Obviously, the nuts 19 and 20 may be manipulated to force the drum section 13 toward the drum section 12, or the nuts may be removed from the arbor or shaft 15 so that the drum sections may be removed therefrom. In Fig. 2, the drum sections 12 and 13 are shown spaced from each other but in practice the nuts 19 and 20 are manipulated to cause the drum sections to abut against each other. The drum sections 12 and 13 have peripheries which are frustro-conical surfaces 22, so that the drum sections may be referred to as frustro-conical drum sections. At their largest diameters the drum sections 12 and 13 are provided with circumferential flanges 24.

Mounted upon the frustro-conical surfaces 22 and disposed around the drum sections is a ring or annulus 25 which is preferably molded from rubber so that it will be both flexible and elastic. However, in some instances we may prefer to employ an annulus or a ring 25 of leather, which is not so elastic but is relatively flexible. It will be noted that the ring 25 is provided with frustro-conical surfaces 27 which rest upon the frustro-conical surface 22. Obviously, when the nuts 19 and 20 are manipulated to urge the drum section 13 toward the drum section 12, the drum sections will tend to expand the ring 25 and will also clamp it between the two drum sections.

The annulus or ring 25 is formed preferably with an outer cylindrical surface 30 upon which a fabricated band rests, the band being designated generally by the reference character 32. The band 32 preferably comprises an outer endless ring 33 of sheet metal which is provided with a plurality of perforations 34 through which tacks 35 project, the heads of the tacks being disposed against the inner side of the ring 33 and being clamped between the ring 33 and another sheet metal ring 36 which is formed by bending a strip of sheet metal around within the ring 33. The band 32 is formed of a strip of sheet metal, the ends being welded to each other as indicated at 39a. A strip 39b of metal reenforces the weld 39a, the strip 39b being welded to the band 32 at the weld 39a and on the inner side thereof. The sheet metal ring 36 is also formed from a strip of metal but the ends of the strip are not welded to each other. The ends of the strip forming the ring 36 abut against the strip 39b. In Fig. 4 the ends of the strip forming the ring 36 are shown in dotted positions to indicate that they are free. The strip forming the ring 36 is secured, intermediate its ends, to the band 32 by a rivet 39.

The arbor or shaft 15 may form part of any suitable mechanism (not shown) and may be rotated by any suitable means (not shown), so that when it is rotated the pointed ends of the tacks 35 will abrade any object with which they are brought into contact.

As indicated above, the device may be employed to remove the treads from old tires and to abrade wood, etc.

While we have shown and described certain embodiments of our invention, it is to be understood that it is capable of many modifications. Changes, therefore, in the construction and arrangement may be made without departing from the spirit and scope of the invention as disclosed in the appended claims, in which it is our intention to claim all novelty inherent in our invention as broadly as permissible, in view of the prior art.

We claim:

1. An abrading device comprising a roller, a ring of endless perforated sheet metal disposed around said roller, tacks with their pointed ends projecting outwardly into the apertures in said sheet metal, and a strip of sheet metal formed into a ring within the first-mentioned ring and having a portion between its ends secured to the inner surface of the first-mentioned ring, the heads of said tacks being disposed between the first-mentioned ring and said strip of sheet metal.

2. An abrading device comprising a roller having a relatively soft flexible cushioning material disposed on its peripheral surface, a ring of endless perforated sheet metal disposed around said roller, tacks with their pointed ends projecting outwardly into the apertures in said sheet metal, and a strip of sheet metal formed into a ring within the first-mentioned ring and having a portion between its ends secured to the inner surface of the first-mentioned ring, the heads of said tacks being disposed between the first-mentioned ring and said strip of sheet metal.

RUDOLPH T. ECKLUND.
PETER C. NEILSEN.